United States Patent
Kim et al.

(10) Patent No.: US 9,323,328 B2
(45) Date of Patent: Apr. 26, 2016

(54) TOUCH PANEL PROVIDING TACTILE FEEDBACK IN RESPONSE TO VARIABLE PRESSURE AND OPERATION METHOD THEREOF

(71) Applicant: Electronics and Telecommunications Research Institute, Daejeon (KR)

(72) Inventors: Young Sung Kim, Daejeon (KR); Ki-Uk Kyung, Daejeon (KR); Suntak Park, Daejeon (KR); Bong Je Park, Daejeon (KR); Sung Ryul Yun, Daejeon (KR); Han Saem Lee, Gwangmyeong (KR); Mi Joeng Choi, Daejeon (KR)

(73) Assignee: ELECTRONICS AND TELECOMMUNICATIONS RESEARCH INSTITUTE, Daejeon (KR)

(\*) Notice: Subject to any disclaimer, the term of this patent is extended or adjusted under 35 U.S.C. 154(b) by 0 days.

(21) Appl. No.: 14/016,565

(22) Filed: Sep. 3, 2013

(65) Prior Publication Data
US 2014/0111480 A1    Apr. 24, 2014

(30) Foreign Application Priority Data
Oct. 19, 2012    (KR) .................... 10-2012-0116708

(51) Int. Cl.
*G06F 3/01*    (2006.01)
*G06F 3/042*    (2006.01)

(52) U.S. Cl.
CPC .............. *G06F 3/016* (2013.01); *G06F 3/0421* (2013.01); *G06F 2203/04109* (2013.01)

(58) Field of Classification Search
CPC ..... G06F 3/042; G06F 3/0421; G06F 3/0412; G06F 3/0428; G06F 3/016; G06F 2203/04109; H03K 17/9627; H03K 17/78; H03K 17/941; H03K 17/968
See application file for complete search history.

(56) References Cited

U.S. PATENT DOCUMENTS

| 7,295,724 | B2 | 11/2007 | Wang et al. | |
|---|---|---|---|---|
| 8,736,581 | B2* | 5/2014 | Han et al. | 345/175 |
| 2008/0284925 | A1* | 11/2008 | Han | 349/12 |
| 2012/0068970 | A1* | 3/2012 | Pemberton-Pigott | 345/175 |
| 2012/0086651 | A1* | 4/2012 | Kwon et al. | 345/173 |
| 2012/0146952 | A1* | 6/2012 | Park et al. | 345/175 |

FOREIGN PATENT DOCUMENTS

| KR | 10-2007-0066810 A | 6/2007 |
|---|---|---|
| KR | 10-2010-0033076 A | 3/2010 |
| KR | 10-2010-0090454 A | 8/2010 |

\* cited by examiner

*Primary Examiner* — Jonathan Boyd
*Assistant Examiner* — Sardis Azongha

(57) ABSTRACT

A touch panel according to an embodiment of the present invention includes: a pressure detection unit including a light-source unit configured to generate an optical signal, an optical waveguide configured to transfer the optical signal, a sensing unit contacting with the optical waveguide to receive the optical signal according to an intensity of pressure applied externally, and a light-receiving unit configured to receive the optical signal transferred through the optical waveguide from the sensing unit; and an actuator contacting with the pressure detection unit to cause a deformation of a material according to the pressure intensity, wherein the actuator provides a tactile feedback through a vibration according to the pressure intensity.

20 Claims, 7 Drawing Sheets

TOUCH PANEL PROVIDING TACTILE FEEDBACK IN RESPONSE TO VARIABLE PRESSURE AND OPERATION METHOD THEREOF

CROSS-REFERENCE TO RELATED APPLICATIONS

This U.S. non-provisional patent application claims priority under 35 U.S.C. §119 of Korean Patent Application No. 10-2012-0116708, filed on Oct. 19, 2012, the entire contents of which are hereby incorporated by reference.

BACKGROUND OF THE INVENTION

The present invention disclosed herein relates to a touch panel, and more particularly, to a touch panel for providing a tactile feedback to a user according to an intensity of externally applied pressure.

Touch panels may be classified into resistive touch panels, capacitive touch panels, infrared touch panels, and ultrasonic touch panels according to operation principles. The resistive touch panels and the capacitive touch panels detect signals generated only by a touch. Therefore, these panels are not suitable for 3D displays that require proximity sensing. The infrared touch panels and the ultrasonic touch panels are not suitable to obtain a small size and implement a multi-touch function.

Recently, an optical waveguide-based touch sensor technology has been developed to overcome the above-mentioned limitations. The optical waveguide-based touch sensor technology enables miniaturization and provides a multi-touch function. Further, this technology enables a panel to have a film-type structure, and thus may be used for a flexible touch panel.

In particular, an optical waveguide-based touch panel using a pressure sensor has been developed. The touch panel using a pressure sensor may measure both a location and pressure and have a multi-touch function. However, this touch panel does not provide, to a user, a tactile feeling, i.e. a three-dimensional or haptic feeling, in response to an input. Therefore, various touch panel technologies for providing tactile feedback to a user are developed.

SUMMARY OF THE INVENTION

The present invention provides an optical waveguide-based touch panel for proving tactile feedback using a pressure sensor.

Embodiments of the present invention provide touch panels including a pressure detection unit configured to receive a first optical signal in response to pressure applied externally and detect location information or pressure intensity according to an intensity of the received first optical signal, and an actuator contacting with the pressure detection unit to cause a deformation of a material in proportion to the pressure intensity, wherein the actuator provides a tactile feedback through a vibration according to the pressure intensity.

In other embodiments of the present invention, methods of operating a touch panel applied in an electronic device includes detecting pressure intensity or location information from a received first optical signal, the first optical signal being transferred through an optical waveguide, applying a driving voltage to an actuator according to the detected pressure intensity, deforming the actuator according to the applied driving voltage, and providing a tactile feedback through a vibration in response to the deformation of the actuator.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
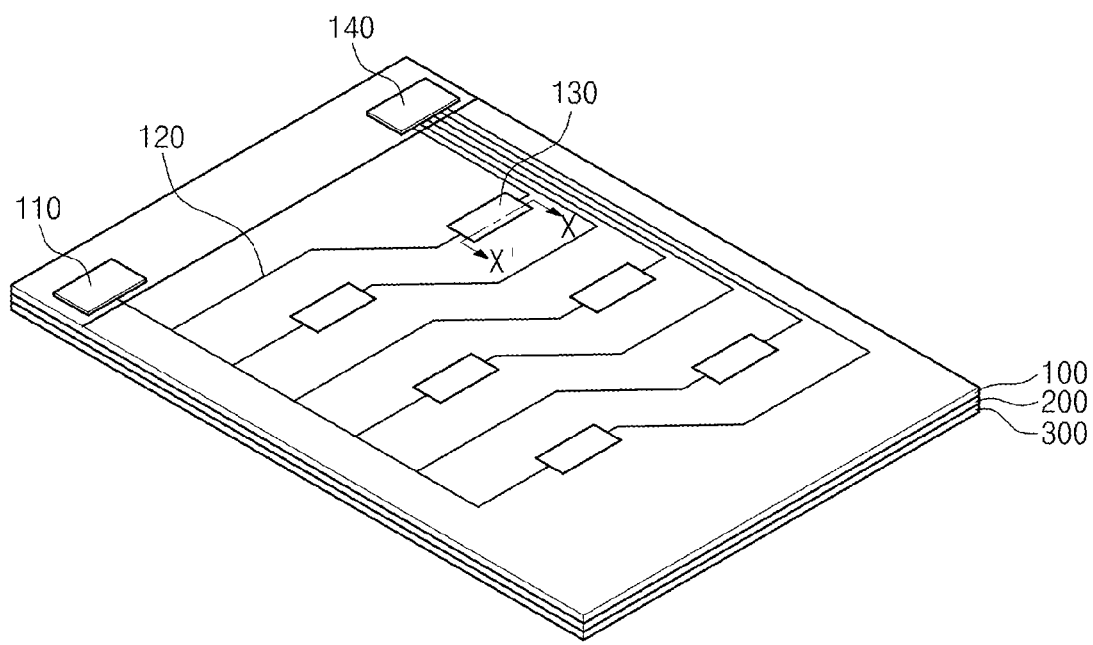
FIG. 1 illustrates a touch panel according to an embodiment of the present invention.

FIG. 1 illustrates a touch panel according to an embodiment of the present invention. Referring to FIG. 1, the touch panel includes a pressure detection unit 100, an actuator 200, and a substrate 300. The touch panel according to the present invention may be an optical touch panel using optical signals.

The pressure detection unit 100 may detect pressure intensity and location information in response to a touch input applied externally. In detail, the pressure detection unit 100 includes a light source unit 110, an optical waveguide 120, a sensing unit 130, and a light-receiving unit 140.

The light-source unit 110 generates an optical signal and transmits the optical signal to the optical waveguide 120. The light-source unit 110 may include various elements for generating the optical signal. In the case where the optical signal is used in a transparent material, the light-source unit 110 may use an infrared optical signal so that the optical signal is not recognized by a user.

The optical waveguide 120 serves to receive the optical signal from the light-source unit 110 and transmit the received optical signal to the sensing unit 130 and the light-receiving unit 140. The optical waveguide 120 may include a core and a clad covering the core that transfers the optical signal received from the light-source unit 110. In order to transfer the optical signal through the core, the cores and the clad are manufactured such that a refractive index of the core is greater than that of the clad. One optical waveguide 120 is one-to-one matched and connected to one sensing unit 130.

The sensing unit 130 may contact with one optical waveguide 120 and may adjust an intensity of the optical signal passing through the optical waveguide 120 according to an intensity of pressure applied externally. More specifically, a touch is externally and directly performed to the sensing unit 130. When the pressure intensity of the touch applied through the sensing unit 130 increases, the intensity of the optical signal transferred through the sensing unit 130 decreases. In other words, as the pressure intensity of the touch increases, a contact area between the optical waveguide 120 and the sensing unit 130 increases. An amount of the optical signal transferred through the sensing unit 130 increases in proportion to the increased contact area, and thus the intensity of the optical signal transferred to the light-receiving unit 140 from the sensing unit 130 decreases.

Likewise, when the pressure intensity of the touch applied through the sensing unit 130 decreases, the intensity of the optical signal transferred to the light-receiving unit 140 from the sensing unit 130 increases. Although it has been described as if the number of the sensing unit 130 is one, the number of the sensing unit 130 is not limited thereto and may be plural.

The light-receiving unit 140 receives the optical signal transferred through the optical waveguide 120 from the sensing unit 130. The light-receiving unit 140 includes a plurality of optical detectors for measuring the intensity of the optical signal. The optical detectors of the light-receiving unit 140 measure pressure intensity and location information in response to the intensity of the optical signal. One optical detector included in the light-receiving unit 140 may be connected to one optical waveguide 120 passing through one sensing unit 130.

Each element included in the pressure detection unit 100 may be formed of a transparent and flexible polymer material.

The actuator 200 may contact with the pressure detection unit 100 and may provide a tactile feedback through vibration in response to the touch input applied externally. It is assumed that the actuator 200 is formed of an electro active polymer (EAP) that is a transparent and flexible material. A deformation degree of the EAP may be controlled according to an applied driving voltage. The EAP has such electrical characteristics as to expand, contract, or bend in response to electrical stimulation.

The actuator 200 includes an electrode unit (not illustrated) that receives, from the pressure detection unit 100, a pressure intensity signal corresponding to the external touch input and applies the driving voltage to the EAP. The electrode unit contacts with the EAP in both directions thereof. Two electrode units respectively supply two opposite potentials to the EAP. Here, the opposite potentials indicate that the two electrodes have opposite polarities such as (+, −) and (−, +). Since the opposite two potentials are applied from the electrode unit, the EAP causes deformation of a material.

The electrode unit may be formed of the same transparent and flexible material as that of the pressure detection unit 100. The material of the actuator 200 is not limited to the EAP, and thus various materials may be used for the actuator 200.

The substrate 300 serves to support the pressure detection unit 100 and the actuator 200. For example, the substrate 300 may be implemented with a platform of an electronic device. The substrate 300 may be formed of a transparent and flexible material.

As described above, the pressure detection unit 100 detects the intensity of the externally applied pressure, and provides the driving voltage to the actuator 200 in response to the detected pressure intensity. Accordingly, the actuator 200 deforms in response to the received driving voltage. Therefore, the user may receive the tactile feedback through vibration according to the intensity of the touch.

Figure 2:
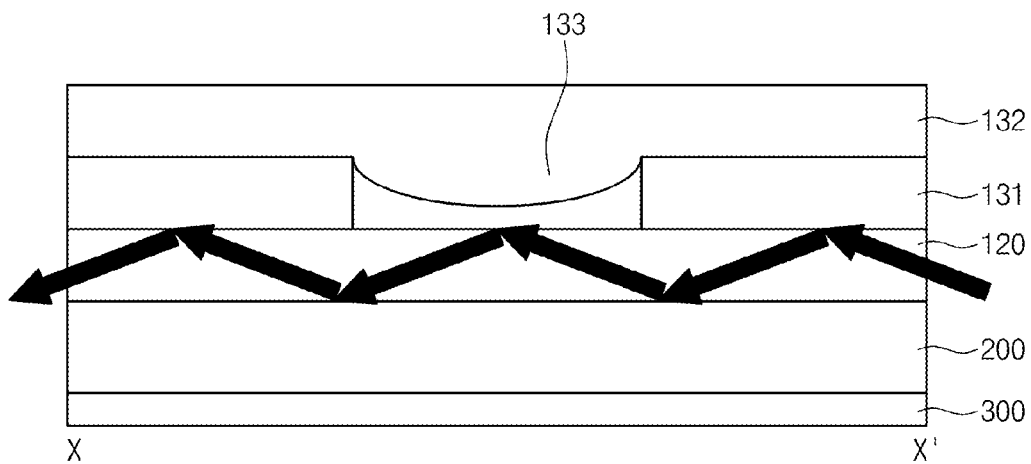
FIGS. 2 and 3 are cross sectional views of the sensing unit taken along the line X-X' of FIG. 1.
Figure 3:
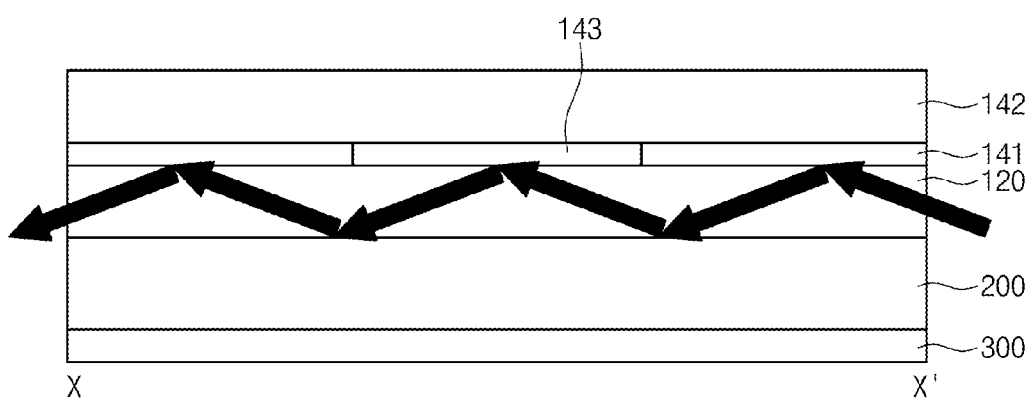

FIGS. 2 and 3 are cross-sectional views of the sensing unit taken along the line X-X' of FIG. 1. Referring to FIG. 2, the substrate 300 that supports the actuator 200 and the pressure detection unit 100 is located at a lowermost layer. A layer of the actuator 200 is disposed on the substrate 300, and a layer of the optical waveguide 120 is disposed on the actuator 200. The material of the layer of the actuator 200 has a lower refractive index than that of the material of the layer of the optical waveguide 120. Accordingly, the optical signal supplied from the light-source unit 110 (see FIG. 1) may be transferred only through the optical waveguide 120 without being scattered to the outside.

The sensing unit 130 includes a lower layer 131, an upper layer 132, and a projection part 133. The lower layer 131 is disposed on the layer of the optical waveguide 120 and is formed of a material having a lower refractive index than that of the material of the optical waveguide 120. Accordingly, the optical signal transferred through the optical waveguide 120 is not scattered through the lower layer 131. A groove may be formed in a portion of the lower layer 131 to which pressure is directly applied externally.

The upper layer 132 is disposed on the lower layer 131 and may be formed of a material having a refractive index that is equal to or higher than that of the material of the optical waveguide 120. The upper layer 132 has the projection part 133 through the groove provided to the lower layer 131. Likewise, the projection part 133 may be formed of a material having a refractive index that is equal to or higher than that of the material of the optical waveguide 120. The projection part 133 may contact with the optical waveguide 120 according to the touch input applied externally. When the pressure intensity of the touch applied to the projection part 133 increases, a contact area between the projection part 133 and the layer of the optical waveguide 120 increases. Accordingly, an amount of the optical signal that is scattered through the projection part 133 increases, and thus the intensity of the optical signal transferred through the layer of the optical waveguide 120 decreases.

In other words, the optical signal transferred through the optical waveguide 120 is not scattered to the outside through the lower layer 131. However, when the projection part 133 having a higher refractive index than that of the optical waveguide 120 contacts with the optical waveguide 120 due to the external touch, the optical signal is partially scattered through the projection part 133 according to the contact area.

FIG. 3 illustrates the sensing unit according to another embodiment of the present invention. Referring to FIG. 3, a sensing unit 140 includes a lower layer 141 and an upper layer 142. Unlike FIG. 2, the lower layer 141 of FIG. 3 is thinner than the lower layer 131 of FIG. 2 and is disposed on the layer of the optical waveguide 120. Since the lower layer 141 is thin, a projection part is not formed in a portion 143 in the sensing unit 140. Due to the thin thickness of the lower layer 141, a part of the lower layer 141 may contact with the layer of the optical waveguide 120 according to the pressure of the touch applied externally.

As described above, the sensing unit 140 does not have the projection part due to the thin thickness of the lower layer 141. However, a structure of the sensing unit 140 is not limited thereto, and thus the sensing unit 140 may be manufactured in various forms according to the use of the sensing unit 140. In other words, the sensing unit 140 may have various structures for easily measuring pressure applied externally. For example, a lowermost portion of the projection part of the sensing unit may have an acuate form.

Figure 4:
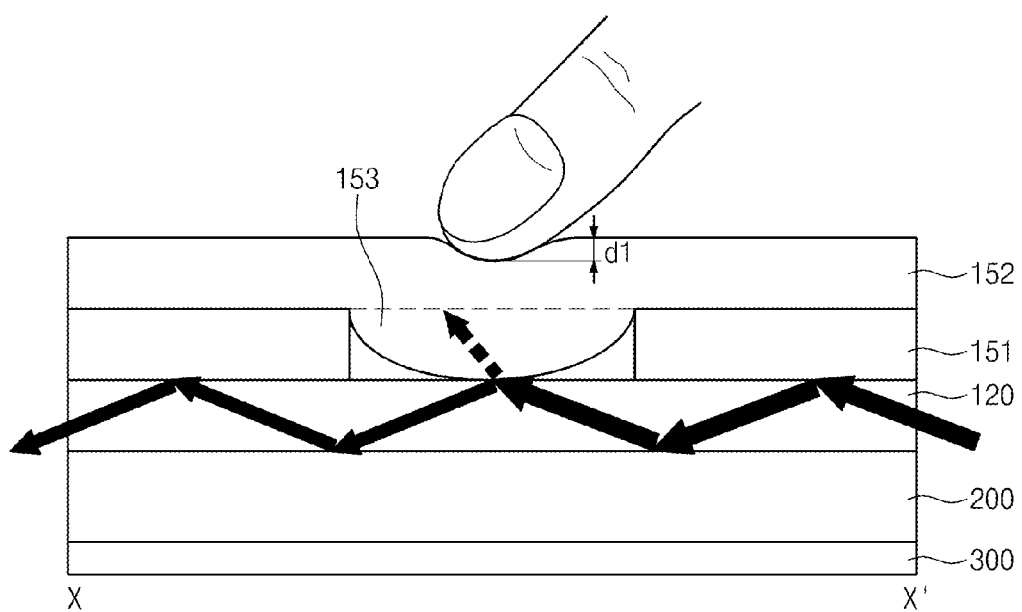
FIGS. 4 and 5 illustrate variations in the intensity of an optical signal according to the intensity of pressure applied to the sensing unit illustrated in FIG. 1.
Figure 5:
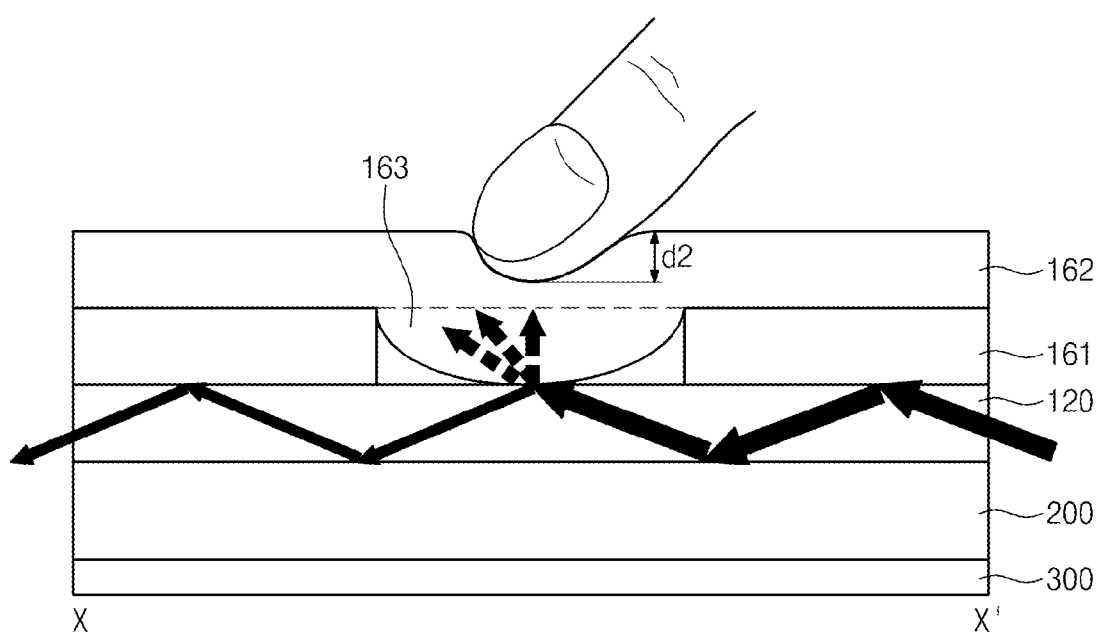

FIGS. 4 and 5 illustrate variations in the intensity of the optical signal according to the intensity of the pressure applied to the sensing unit illustrated in FIG. 1. Referring to FIG. 4, the externally applied pressure is applied to an upper layer 152. For example, when the intensity of the pressure applied to the upper layer 152 corresponds to a distance d1, a projection part 153 provided to the upper layer 152 contacts with the layer of the optical waveguide 120 through a groove of a lower layer 151 in proportion to the intensity of the applied pressure. When it is assumed that the intensity of the optical signal transferred through the layer of the optical waveguide 120 is 100 percent, about 20 percent of the optical signal is scattered through the projection part 153 contacting with the layer of the optical waveguide 120 according to the intensity of the pressure corresponding to the distance d1.

Referring to FIG. 5, when the intensity of the pressure applied to an upper layer 162 corresponds to a distance d2, a projection part 163 provided to the upper layer 162 contacts with the layer of the optical waveguide 120 through a groove of a lower layer 161 in proportion to the intensity of the applied pressure. When it is assumed that the intensity of the optical signal transferred through the layer of the optical waveguide 120 is 100 percent, about 40 percent of the optical signal is scattered through the projection part 163 contacting with the layer of the optical waveguide 120 according to the intensity of the pressure corresponding to the distance d2.

The upper layer 132 included in the sensing unit 130 (see FIG. 1) is formed of a material having a higher refractive index than that of the material of the optical waveguide 120. Accordingly, when the upper layer 132 contacts with the optical waveguide 120, the optical signal moving through the optical waveguide 120 may be scattered through the upper layer 132. In addition, referring to FIGS. 4 and 5, as the intensity of the externally applied pressure increases, the contact area between the projection part 133 and the optical waveguide 120 increases. In other words, as the contact area between the projection part 133 and the optical waveguide 120 increases, the amount of the optical signal scattered through the projection part 133 increases.

As described above, according to the intensity of the externally applied pressure, the intensity of the optical signal received by the light-receiving unit 140 (see FIG. 1) is changed. The light-receiving unit 140 detects location information on the touch panel and an intensity of a driving voltage to be applied to the electrode unit (not illustrated) on the basis of the intensity of the received optical signal. The electrode unit receives a driving voltage to be applied to the EAP from an external power supply (not illustrated) in response to the intensity of the driving voltage detected in the light-receiving unit 140. Here, the external power supply is a power supply device for applying the driving voltage, and is disposed on a portion of the touch panel. Therefore, the user may receive the tactile feedback according to the pressure intensity of the touch.

Figure 6:
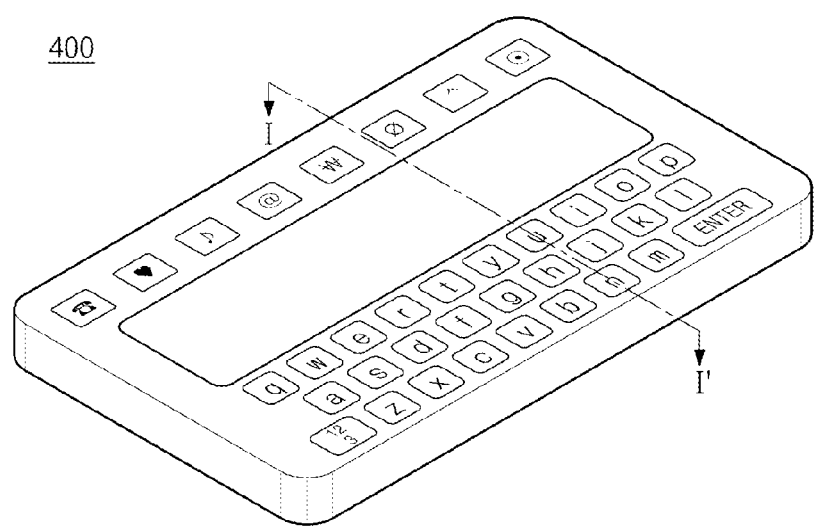
FIG. 6 illustrates an example where the touch panel according to an embodiment of the present invention is applied to an electronic device.

FIG. 6 illustrates an example where the touch panel according to an embodiment of the present invention is applied to a touch screen-type electronic device. Referring to FIG. 6, a touch screen 400 is operated based on the pressure detection unit 100 (see FIG. 1), and provides the tactile feedback to the user according to the pressure intensity of the touch.

According to a typical touch screen, a user should observe content displayed on the screen in order to identify whether the inputted content is correct. However, according to the touch screen using the touch panel of the present invention, the user may identify whether the inputted content is correct without observing the displayed content. This will be described in detail with reference to FIG. 7.

Figure 7:
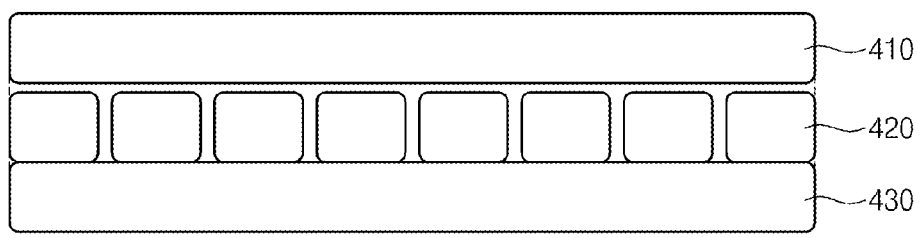
FIG. 7 is a cross-sectional view of the touch panel taken along the line I-I' of FIG. 6.

FIG. 7 is a cross-sectional view of the touch panel taken along the line I-I' of FIG. 6. Referring to FIG. 7, the touch screen 400 (see FIG. 6) includes a pressure detection unit 410, an actuator 420, and a substrate 430.

When the user touches a portion of a keyboard on the touch screen, the pressure detection unit 410 detects an intensity of pressure of the touch and location information on the touch. Then, the pressure detection unit 410 transfers a driving voltage to the actuator 420 according to the pressure intensity. The actuator 420 deforms in a vertical or horizontal direction in response to an applied current signal. Through this operation, the user may receive a tactile feedback.

For example, it is assumed that the user presses a button "R" on the keyboard. When the user applies at least a certain level of pressure to the button "R", the actuator 420 generates weal vibrations twice according to the current signal received from the pressure detection unit 410 to deliver the vibrations to the user. Accordingly, the user may recognize that "R" is inputted. Here, this button is merely an example. That is, the touch screen 400 to which the touch panel of the present invention is applied may provide a specific tactile feedback for all buttons on the keyboard.

The substrate 430 is implemented with a platform of an electronic device and supports the pressure detection unit 410 and the actuator 420.

Since the EAP of the actuator 200 is arranged in a matrix form under the pressure detection unit 100, a different tactile feedback may be provided with respect to each input button.

Figure 8:
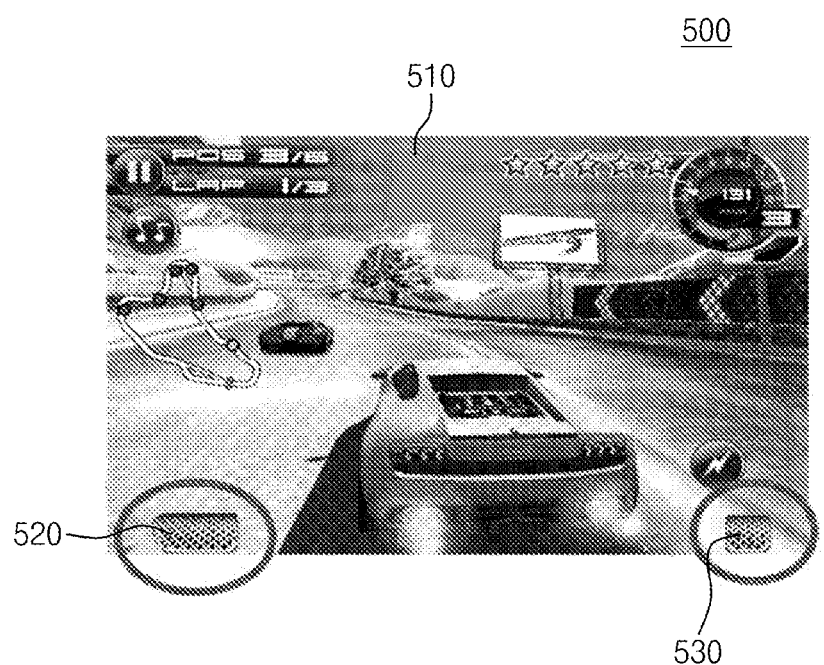
FIG. 8 illustrates another example where the touch panel according to an embodiment of the present invention is applied to an electronic device.

FIG. 8 illustrates another example where the touch panel according to an embodiment of the present invention is applied to an electronic device. Referring to FIG. 8, the touch panel is applied to a touch screen 500 of a video-game machine. In the touch screen 500, an accelerator 520 and a brake 530 are displayed on a display unit 510 where a video game is displayed.

When the user applies pressure to the accelerator while playing the video game, the pressure detection unit 100 (see FIG. 1) transmits a driving voltage to the actuator 200 (see FIG. 1) in response to the applied pressure. Accordingly, the user may receive a tactile feedback through gradational vibration. Further, the user may receive a gradational tactile feedback according to the pressure applied to the brake 520.

As described above, the user may receive the tactile feedback according to the intensity of pressure applied to the electronic device including the touch panel according to the present invention. Therefore, the user may more correctly perform a touch operation and may receive a three-dimensional feel. Further, the touch panel may be applied to other devices such as panels for a game and doorlocks having a password setting function.

A controller (not illustrated) may be included in a part of the touch panel and the electronic device. The controller may control an overall operation of the touch panel. For example, the controller may transmit, to the electrode unit of the actuator 200, the driving voltage generated according to the intensity of the optical signal transmitted to the light-receiving unit 140 (see FIG. 1).

Figure 9:
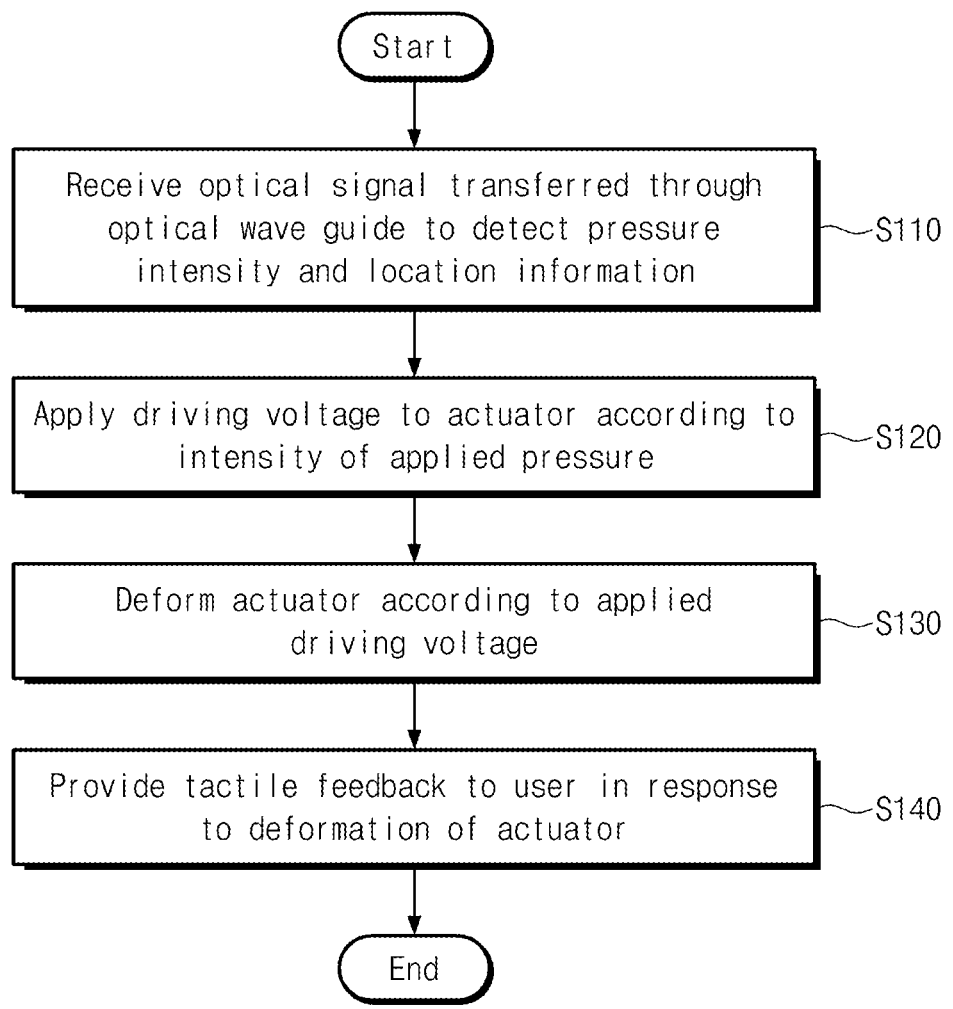
FIG. 9 is a flowchart illustrating an operation of the touch panel according to an embodiment of the present invention.

FIG. 9 is a flowchart illustrating an operation of the touch panel according to an embodiment of the present invention. Referring to FIG. 9, in operation S110, the light-receiving unit 140 (see FIG. 1) detects the location information and pressure intensity according to the intensity of pressure applied externally.

More specifically, when the intensity of the externally applied pressure increases, the contact area between the projection part 133 (see FIG. 2) of the sensing unit 130 and the optical waveguide 120 increases. Accordingly, the optical signal transmitted through the optical waveguide 120 is partially scattered through the projection part 133, and the light-receiving unit 140 detects the intensity of the reduced optical signal. According to the intensity of the optical signal measured in the light-receiving unit 140, the intensity of the externally applied pressure and the location information may be detected.

In operation S120, the controller (not illustrated) generates the driving voltage according to the intensity of pressure detected from the light-receiving unit 140 and transmits the driving voltage to the electrode unit (not illustrated) provided to the actuator 200. The electrode unit is attached to both sides of the EAP of the actuator 200 to apply the driving voltage.

In operation S130, the EAP of the actuator 200 causes a deformation of a material according to the driving voltage applied from the electrode unit. In other words, a degree of the deformation of the material of the EAP varies with the intensity of the applied driving voltage. When the intensity of the driving voltage applied to the EAP increases, the EAP more seriously causes the deformation of the material.

In operation S140, the user may receive the tactile feedback through vibration caused by the deformation of the material of the EAP. In this manner, the user may receive the tactile feedback gradationally according to the intensity of a touch input. Therefore, the user may use a touch function that enables a more correct input operation and provides a three-dimensional feel.

According to an embodiment of the present invention, the touch panel can provide a tactile feedback according to an intensity of touch pressure applied externally. Therefore, a user can detect in real time whether an input to the touch panel is performed.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A touch panel comprising: a pressure detection unit configured to generate a first optical signal, receive a second optical signal in response to a pressure applied externally, and detect location information, a pressure intensity, or both, according to an intensity of the received second optical signal, the pressure detection unit comprising: a light-source unit configured to generate the first optical signal; an optical waveguide configured to transmit the first optical signal; and a sensing unit disposed on the optical waveguide and configured to adjust the first optical signal to the second optical signal according to the pressure; and a light-receiving unit configured to receive the second optical signal transmitted through the optical waveguide, wherein the pressure detection unit detects the location information, the pressure intensity, or both according to the second optical signal received at the light-receiving unit, and wherein the sensing unit comprises: a lower layer including a first portion, a second portion, and a groove defined by the first and second portions, the lower layer disposed on the optical waveguide; and an upper layer disposed directly on the lower layer and having a projection portion, the projection portion protruding from a bottom portion of the upper layer into the groove; and an actuator contacting the pressure detection unit to cause a deformation of a material in proportion to the pressure intensity, wherein the actuator provides a tactile feedback through a vibration according to the pressure intensity; wherein a distance between a bottom surface of the projection portion of the upper layer and an upper surface of the optical waveguide in the groove is less than a thickness of each of the first portion and the second portion of the lower layer; and wherein the distance between the bottom surface of the projection portion of the upper layer and the upper surface of the optical waveguide in the groove is greater than zero when the pressure is not applied to the upper layer, a portion of the upper surface of the optical waveguide corresponding to a bottom surface of the groove.

2. The touch panel of claim 1, further comprising a substrate for supporting the pressure detection unit and the actuator.

3. The touch panel of claim 1, wherein the pressure detection unit is formed of a material that is transparent and is deformable by the pressure applied externally.

4. The touch panel of claim 3, wherein the location information and the pressure intensity are detected according to the intensity of the second optical signal received by the light-receiving unit.

5. The touch panel of claim 1, wherein the lower layer is formed of a first solid material having a lower refractive index than that of the optical waveguide, and the upper layer is formed of a second solid material having a higher refractive index than that of the optical waveguide.

6. The touch panel of claim 1, wherein a contact area between the projection portion of the upper layer and the optical waveguide varies with the intensity of the pressure applied externally.

7. The touch panel of claim 1, wherein the actuator comprises an electrode unit to generate a driving voltage according to the pressure intensity.

8. The touch panel of claim 7, wherein the actuator deforms in response to the driving voltage generated in the electrode unit.

9. The touch panel of claim 8, wherein the electrode unit is formed of a transparent and flexible material.

10. The touch panel of claim 1, wherein the projection portion of the upper layer in the sensing unit contacts the optical waveguide to scatter the portion of the first optical signal through the projection portion according to a touch input applied externally.

11. The touch panel of claim 1, wherein the groove is defined by sidewalls of the first and second portions of the lower layer, and the sidewalls are disposed adjacent and opposite to each other.

12. The touch panel of claim 1, wherein the actuator includes a plurality of portions that are formed of electroactive polymer (EAP) and arranged in a matrix form, and the actuator is disposed between the pressure detection unit and a substrate.

13. A method of operating a touch panel applied in an electronic device, the method comprising: generating a first optical signal and transmitting the first optical signal through an optical waveguide through a sensing unit; the sensing unit comprising: a lower layer including a first portion, a second portion, and a groove defined by the first and second portions, the lower layer disposed on the optical waveguide; and an upper layer disposed directly on the lower layer and having a projection portion, the projection portion protruding from a bottom portion of the upper layer into the groove; detecting a pressure intensity, location information, or both, according to a second optical signal received by a light-receiving unit through the sensing unit; applying a driving voltage to an actuator according to the detected pressure intensity; deforming the actuator according to the applied driving voltage; and providing a tactile feedback through a vibration in response to the deformation of the actuator, wherein a distance between a bottom surface of the projection portion of the upper layer and an upper surface of the optical waveguide in the groove is less than a thickness of each of the first portion and the second portion of the lower layer; and wherein the distance between the bottom surface of the projection portion of the upper layer and the upper surface of the optical waveguide in the groove is greater than zero when the pressure is not applied to the upper layer, a portion of the upper surface of the optical waveguide corresponding to a bottom surface of the groove.

14. The method of claim 11, wherein the projection portion of the upper layer in the sensing unit contacts the optical waveguide to scatter a portion of the first optical signal through the projection portion according to a touch input applied externally.

15. The method of claim 13, wherein the deforming of the actuator comprises:
   determining the driving voltage to be applied to the actuator according to the detected pressure intensity; and
   supplying the driving voltage to an electrode unit provided to the actuator.

16. The touch panel of claim 13, wherein the groove is defined by sidewalls of the first and second portions of the lower layer, and the sidewalls are disposed adjacent and opposite to each other.

17. The touch panel of claim 13, wherein the actuator includes a plurality of portions that are formed of electroactive polymer (EAP) and arranged in a matrix form, and the actuator is disposed between the pressure detection unit and a substrate.

18. A touch panel comprising: a light-source unit configured to generate a first optical signal; an optical waveguide configured to transmit the first optical signal; a sensing unit disposed on the optical waveguide and configured to adjust the first optical signal to a second optical signal according to a pressure applied externally; and a light-receiving unit configured to receive the second optical signal transmitted through the optical waveguide, wherein the sensing unit comprises: a lower layer including a first portion, a second portion, and a groove defined by the first and second portions, the lower layer disposed on the optical waveguide; and an upper layer disposed directly on the lower layer and having a projection portion, the projection portion protruding from a bottom portion of the upper layer into the groove; and an actuator configured to provide a tactile feedback through a vibration based on a magnitude of the applied pressure, wherein a distance between a bottom surface of the projection portion of the upper layer and an upper surface of the optical waveguide in the groove is less than a thickness of each of the first portion and the second portion of the lower layer; wherein the distance between the bottom surface of the projection portion of the upper layer and the upper surface of the optical waveguide in the groove is greater than zero when the pressure is not applied to the upper layer, a portion of the upper surface of the optical waveguide corresponding to a bottom surface of the groove, and wherein location information, a pressure intensity, or both is detected according to the second optical signal received at the light-receiving unit.

19. The touch panel of claim 18, wherein the groove is defined by sidewalls of the first and second portions of the lower layer, and the sidewalls are disposed adjacent and opposite to each other.

20. The touch panel of claim 18, wherein the actuator includes a plurality of portions that are formed of electroactive polymer (EAP) and arranged in a matrix form, and the actuator is disposed between the pressure detection unit and a substrate.

* * * * *